Dec. 29, 1925.
L. C. COLE ET AL
1,567,356
MULTIPLE DRILL
Filed Dec. 26, 1922
4 Sheets—Sheet 2
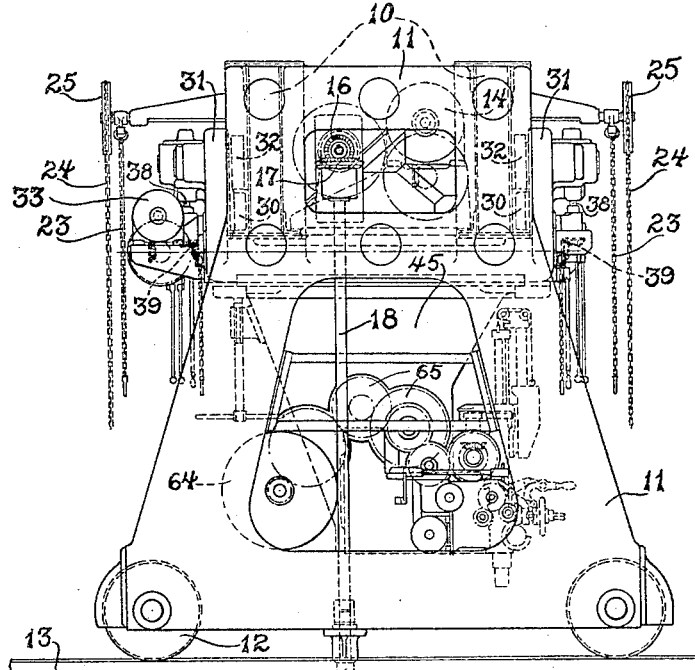
Fig.2.
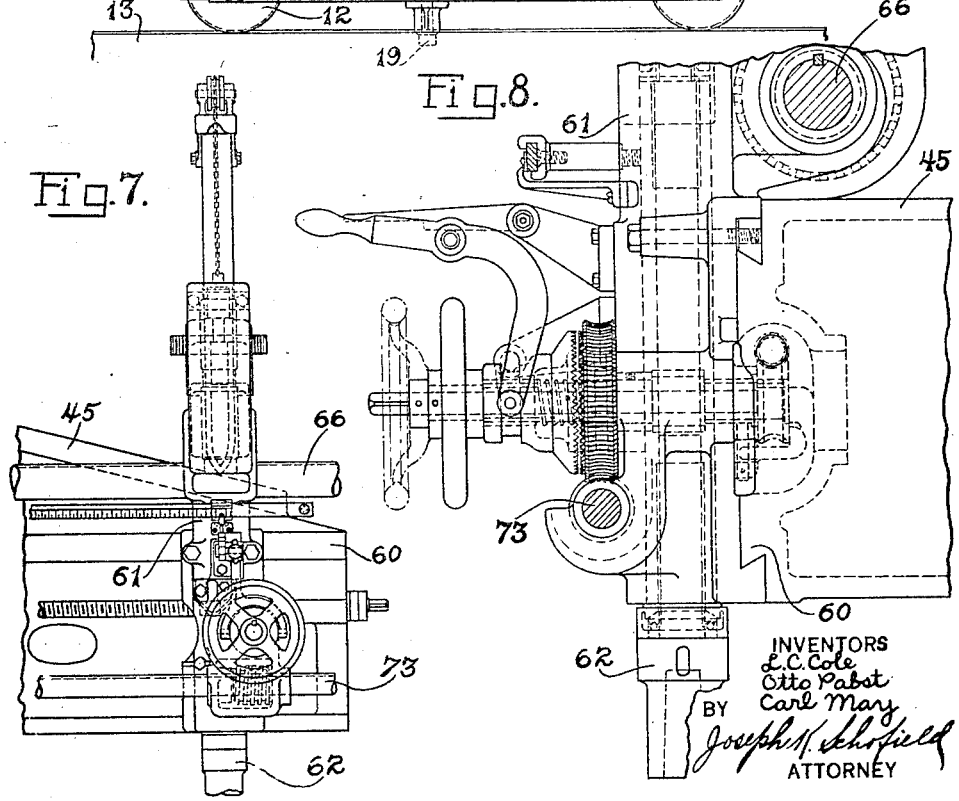
Fig.7.
Fig.8.
INVENTORS
L.C. Cole
Otto Pabst
Carl May
BY Joseph N. Schofield
ATTORNEY

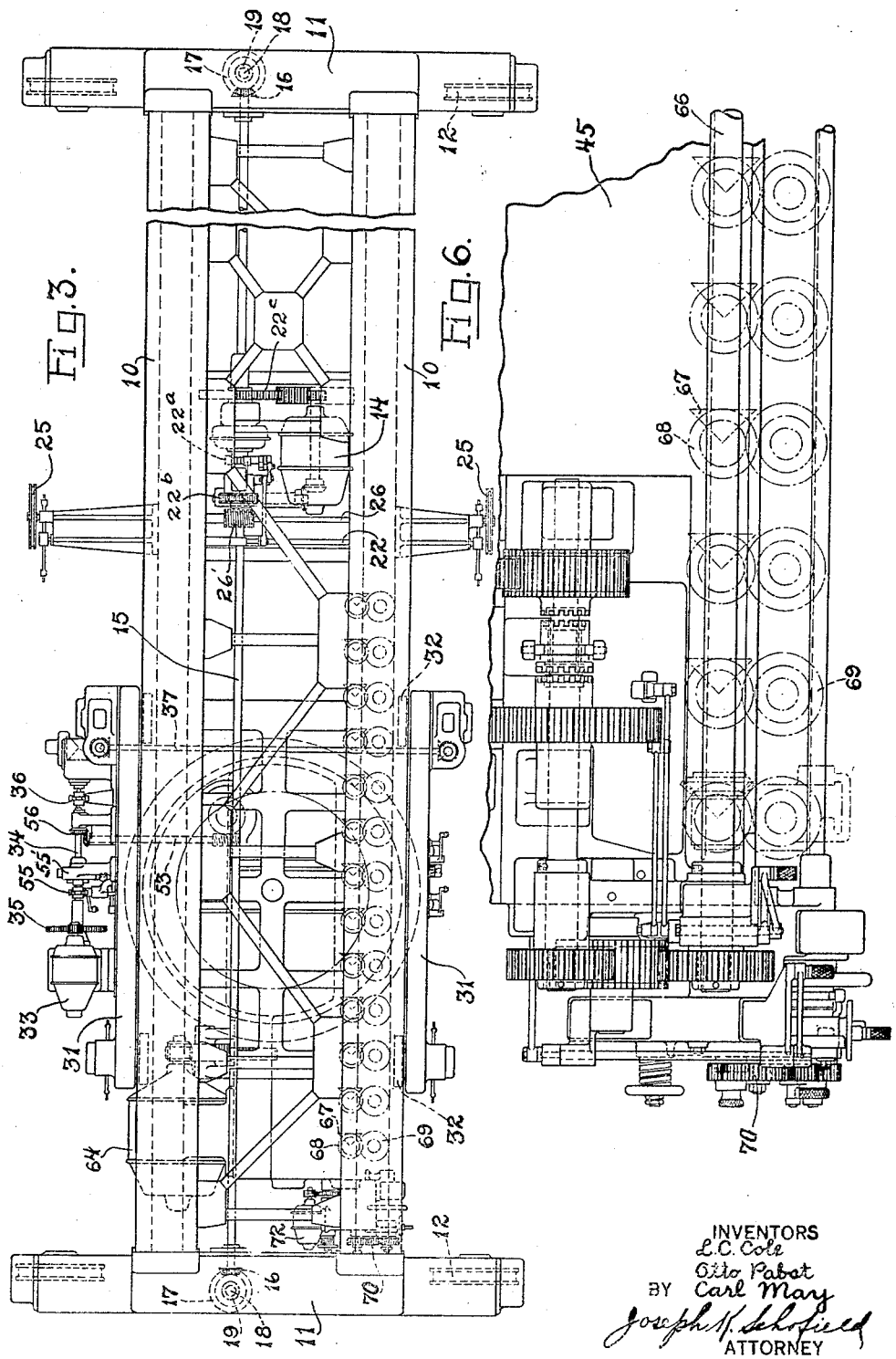

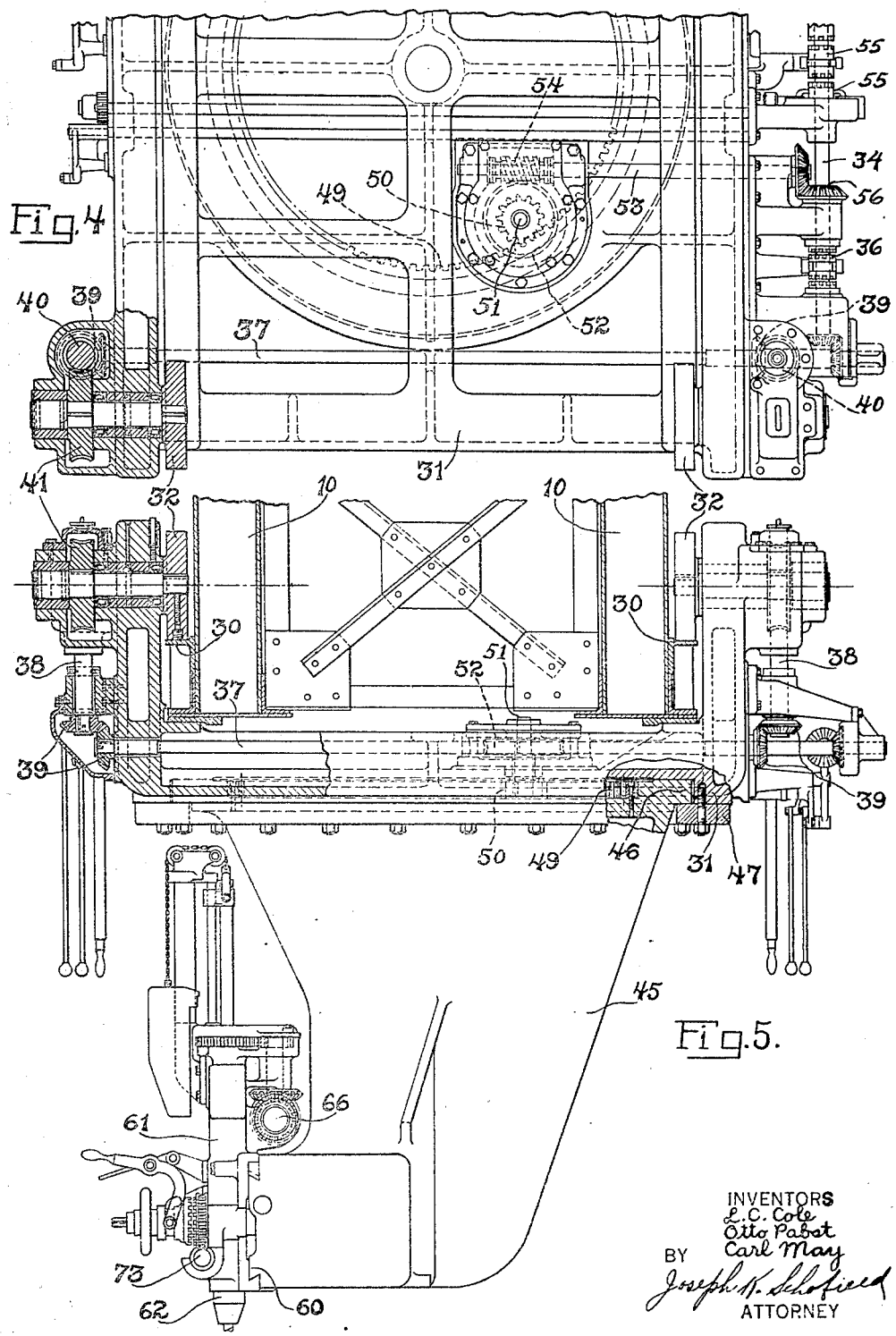

Patented Dec. 29, 1925.

1,567,356

UNITED STATES PATENT OFFICE.

LYNDON C. COLE, OTTO PABST, AND CARL MAY, OF HAMILTON, OHIO, ASSIGNORS TO NILES-BEMENT-POND COMPANY, OF NEW YORK, N. Y., A CORPORATION OF NEW JERSEY.

MULTIPLE DRILL.

Application filed December 26, 1922. Serial No. 609,112.

*To all whom it may concern:*

Be it known that we, LYNDON C. COLE, OTTO PABST, and CARL MAY, citizens of the United States, residing at Hamilton, in the county of Butler and State of Ohio, have invented certain new and useful Improvements in Multiple Drills, of which the following is a specification.

This invention relates to a multiple spindle drilling machine and in particular to one having a plurality of parallel drill spindles mounted upon a carriage which may be traversed longitudinally along a Gantry crane.

An object of the present invention is to improve the construction of drilling machines of this type so that the position of the drill spindles may be varied in all directions either by movement longitudinally or rotatably of the drill carrying member.

One feature which enables us to accomplish the above named object is that the carriage supported upon and depending from the crane, which is movable along the bridge of the crane, is provided with a depending member having a horizontal guide rail at one side. The entire drill carrying member is rotatably supported in the carriage and is adapted to be swiveled about a vertical axis.

Another feature which is of advantage is that the drill spindles are all arranged in a straight line on the guide rail and are adjustable toward or away from each other, each of the spindles being driven by a common source of power and provided with feeding means which may be operated by a separate electric motor or by the drill rotating motor as may be desired.

Another feature of advantage is that all of the mechanisms of this drill may be controlled by electric motors, preferably a small motor being provided to traverse the crane along suitable supports, another motor provided for traversing the carriage on the bridge of the crane and for swiveling the guide rail carrying member, and a third motor being provided to rotate and feed the drill spindles.

With these and other objects in view, our invention consists in the features of construction and operation set forth in the following specification and illustrated in the accompanying drawings.

In the accompanying drawings annexed hereto and forming a part of the specification, we have shown our invention embodied in a plate drilling machine of large size but it will be understood that the invention or some parts thereof can be otherwise embodied and that the drawings are not to be construed as defining or limiting the scope of the invention, the claims appended to this specification being relied upon for that purpose.

In the drawings:

Fig. 2 is an end elevation of the same.

Fig. 3 is a plan view of the entire mechanism.

Fig. 4 is a plan view of a portion of the carriage, its driving mechanism and the rotating means for the spindle carrying member.

Fig. 5 is an elevation of the same.

Fig. 6 is a fragmentary plan view of the spindle supporting member and driving means for the drill spindles.

Fig. 7 is a front view of one of the spindles on its guide rail.

Fig. 8 is a side elevation of the same upon a larger scale.

Figure 1:
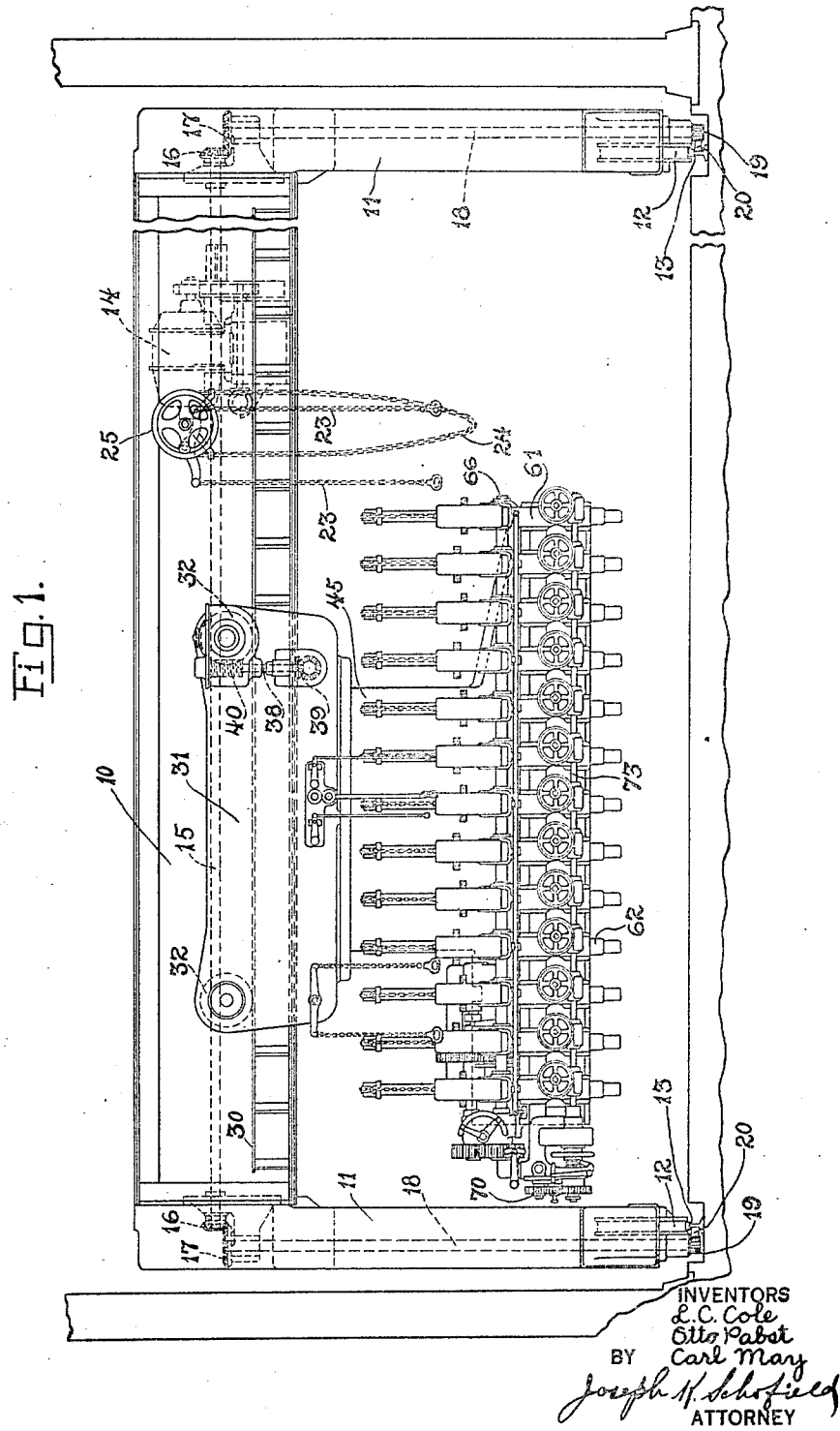
Figure 1 is a front elevation of the entire mechanism forming the present invention.

In the above mentioned drawings, we have shown but one modification of the invention but it is to be understood that changes and modifications may be made within the scope of the appended claims without departing from the spirit of the invention.

Briefly, our invention in its broadest aspect comprises the following principal parts: first, a crane preferably of the Gantry type having a horizontal bridge supported at its opposite ends by suitable uprights and adapted to be traversed upon rails preferably provided in the floor of the shop where the machine is to be used; second, a motor mounted on the bridge of the crane and adapted to traverse the entire mechanism along the rails provided for it; third, a carriage movable on the bridge of the crane and having a member depending therefrom adapted to be swiveled about a vertical axis;

fourth, a motor mounted on the carriage and adapted to traverse the carriage in either direction along the bridge of the crane and also to swivel the depending member about its vertical axis; fifth, a guide rail on one side of the swiveling member adapted to support a plurality of drill heads so that they may be conveniently adjusted along the guide rail; sixth, means mounted on the swiveling member to drive all of said drills and to feed them vertically upward or downward.

Referring more in particular to the figures of the drawings, we provide a crane of the Gantry type having an elongated bridge member 10 preferably made up of structural steel and supported at the opposite ends by housings or supports 11. The lower ends of the supports are provided with rollers 12 adapted to engage rails 13 fixed horizontally in the floor of the shop where the machine is to be used. Mounted on the bridge portion 10 of the crane, a motor 14 is provided, adapted to be coupled to a horizontal shaft 15 extending the length of the bridge member 10 in such a manner that this shaft may be rotated in opposite directions. At the opposite ends of this shaft 15 are bevel gears 16 in engagement with bevel gears 17 on the upper ends of shafts 18 provided in the housings or supports 11. At the lower ends of these shafts 18, pinions 19 are provided engaging racks 20 fastened to the supporting rails 13. By the above described means, the entire crane 10 and parts thereon supporting the drills may be traversed either forward or rearward along the supporting rails 13. An oscillating shaft 22 extending transversely across the bridge 10 of the crane is adapted to be operated by depending chains 23 to shift a clutch indicated generally at 22$^a$ whereby to traverse the crane slowly from a worm wheel 22$^b$ or rapidly from a gear 22$^c$. Supplementing this motor control is a hand operated drive operated by a chain 24 extending around a wheel 25 in engagement with a shaft 26 adjacent the motor 14 and having an operating worm 26' thereon. By this means when the shaft 26 is coupled to shaft 15, the entire crane and the mechanism supported thereby can be manually moved in either direction to accurately adjust the drills to any desired position.

On opposite sides of the bridge member 10 of the crane and extending horizontally throughout its entire length are guide rails 30 forming supports for the crane carriage 31. The carriage member 31 which as shown depends below the lower surface of the bridge 10 is provided with rollers 32, two being provided on each side of the bridge which are in engagement with the supporting rails 30. In order to move the carriage to the left or right along the bridge member, two of the rollers 32 are adapted to be driven through suitable gearing from an electric motor 33 mounted on the carriage 31 and adapted to be coupled to these driving means.

As most clearly shown in Fig. 3, the small motor 33 is mounted at one side of the carriage 31 which drives a shaft 34 through a pair of spur gears 35 as shown. Through a suitable clutch indicated at 36, this shaft 34 is adapted to drive a horizontal shaft 37 extending transversely of the carriage 31. This shaft 37 is connected with short vertical shafts 38 at its opposite ends by means of bevel gears 39, each of which is provided with a worm 40. In engagement with each of these worms 40 are worm wheels 41 in driving connection with the rollers 32, one on each side of the bridge 10. By these means, it is only necessary to move the clutch 36 into driving position and rotate the motor 33 in the proper direction to traverse the carriage 31 in either direction along the bridge 10.

Depending from the carriage 31 is a drill supporting member 45 adapted to be swiveled about a vertical axis. This member 45 is supported as shown most clearly in Fig. 5 from one of the lower surfaces of the carriage 31. A narrow flange 46 on the swiveling member 45 is engaged by a clamping ring 47 secured to the carriage 31. On its upper surface this swiveling member 45 is provided with a large internal gear 49 concentric with the axis about which it may be swiveled. In mesh with this gear 49 is a small pinion 50 on the lower end of a shaft 51 which at its upper end is provided with a worm wheel 52. A shaft 53 having a worm 54 thereon in mesh with the worm wheel 52 is also adapted to be driven from the motor 33. A bevel gear 56 loose on the shaft 34 is in mesh with a bevel gear on the shaft 53. As shown in Fig. 3 the clutch 36 on the shaft 34 may be shifted in one direction to connect the shaft 34 with the bevel gear 56 to drive the shaft 53 and in the opposite direction to connect the shaft 34 with the shaft 37 to traverse the carriage 31. A clutch 55 is also provided whereby the shaft 34 may either be power driven from the motor 33 or manually operated from mechanism illustrated generally at 55'.

The swiveling member 45 at one side of its lower surface is provided with a spindle supporting guide rail 60. This extends in a straight line the full length of the swiveling member 45 and is preferably provided with a dove-tailed projection adapted to conveniently engage the drill heads 61 of the spindles 62 in such a manner that they may be conveniently adjusted to any position along the guide rail 60. Also mounted on this swiveling member is a large rotating motor 64 for the spindles 62 which is connected through suitable gearing 65 to an elongated shaft 66 extending parallelly to and adjacent the guide rail 60. A plurality of bevel gears 67 are splined to this shaft 66, each of which may be engaged by a bevel gear 68 adapted to drive the different drill spindles through spur gears 69.

The machine is adapted not only for drilling holes but also for tapping the same. The feed of the spindles for such tapping operations is accomplished by gears 70 from the main spindle rotating motor 64 to a feed shaft 73. In this way a positive feed for the spindles is provided. Another and smaller motor 72 is adapted to be conveniently connected to the shaft 73 for rapidly traversing the drill spindles. This mechanism comprises the subject matter of our copending application Serial No. 609,113 filed on even date herewith and therefore will not be further described herein.

From the above, it will be seen that we have provided a plurality of drill heads 61 each carrying a vertically movable spindle 62 so that it may be adjusted along a rail 60 and that this rail 60 which is mounted on a depending member 45 may be swiveled to any angular position. The member 45 which is mounted on the carriage 31 may also be traversed to any extent in directions at right angles to each other by appropriate movements along bridge 10 or by movement of the crane along the rails 13. Thus, it is possible to so position the spindles 62 that they may be in a straight line in any position within the range of movements of the carriage 31 and bridge 10.

What we claim is:

1. In a machine of the class described, the combination of an elongated support, a carriage supported thereon for movement therealong, a member supported by and extending below the carriage, a guide-rail on said member, a plurality of drill spindles supported for individual adjustment on said guide-rail, means for securing the spindles in adjusted position, and power operated means for moving the carriage on its support and for swiveling the said member about a vertical axis.

2. In a machine of the class described, the combination of an elongated support, a carriage supported thereon for movement therealong, a member supported by and extending below the carriage, a guide-rail on said member, a plurality of drill spindles adjustably supported on said guide-rail, a spindle rotating motor on said member adjacent said guide-rail, and a single power operated means for moving the carriage on its support and for swiveling the said member about a vertical axis.

3. In a machine of the class described, the combination of a pair of parallel tracks, an elongated horizontal support supported at its ends on said tracks, a carriage mounted on the support for movement therealong, a member supported by and extending below the carriage, a plurality of drill spindles supported vertically in the member, power operated means on said carriage optionally usable for moving the carriage on its support or for swiveling the said member about a vertical axis, and means for moving the elongated support and its load along the said tracks transversely of the said carriage movement.

4. In a machine of the class described, the combination of a pair of spaced uprights, a horizontal beam supported at its ends in said uprights, a carriage supported thereon for movement therealong, a drill supporting member below and supported by the carriage, a plurality of vertical spindles relatively adjustable laterally on the member, power operated means on said carriage optionally usable for moving the carriage along the beam or for swiveling the said member about a vertical axis, and means for moving the uprights and beam with its load transversely of the said carriage movement.

5. In a machine of the class described, the combination of a pair of parallel tracks, a pair of spaced uprights mounted each on one of said tracks, a horizontal beam supported at its ends in said uprights, a carriage supported thereon for movement therealong, a drill supporting member below and supported by the carriage, a plurality of vertical spindles relatively adjustable laterally on the member, means on the carriage optionally usable for moving the carriage along the beam or for swiveling the said member about a vertical axis, and a motor supported by the beam for moving the uprights and beam with its load along the said tracks transversely of the said carriage movement.

6. In a machine of the class described, the combination of an elongated support, a carriage supported thereon for movement therealong, a member supported by and extending below the carriage, a plurality of drill spindles adjustably supported on said member, power operated means on the support for moving the carriage and for swiveling the said member about a vertical axis, and means on the member for rotating the drill spindles.

7. In a machine of the class described, the combination of an elongated support, a carriage supported thereon for movement therealong, a member supported by and extending below the carriage, a plurality of drill spindles adjustably supported on said member, an electric motor on the support for moving the carriage and for swiveling the said member about a vertical axis, and an electric motor on the member for rotating the drill spindles.

8. In a machine of the class described, the combination of an elongated support, a carriage supported thereon for movement therealong, a member supported by and extending below the carriage, a horizontally extending guide-rail on said member adapted to support a plurality of drill spindles, drill spindles on said guide-rail, rotating means for said spindles comprising a single motor mounted on said member, means to traverse said carriage on said support and to swivel said member about the carriage comprising a motor mounted on and movable with said carriage.

In testimony whereof, we hereto affix our signatures.

LYNDON C. COLE.
OTTO PABST.
CARL MAY